US006662156B2

(12) United States Patent
Bartosik

(10) Patent No.: US 6,662,156 B2
(45) Date of Patent: Dec. 9, 2003

(54) SPEECH DETECTION DEVICE HAVING MULTIPLE CRITERIA TO DETERMINE END OF SPEECH

(75) Inventor: Heinrich Bartosik, Vienna (AT)

(73) Assignee: Koninklijke Philips Electronics N.V., Eindhoven (NL)

( * ) Notice: Subject to any disclaimer, the term of this patent is extended or adjusted under 35 U.S.C. 154(b) by 386 days.

(21) Appl. No.: 09/768,561

(22) Filed: Jan. 24, 2001

(65) Prior Publication Data

US 2001/0012996 A1 Aug. 9, 2001

(30) Foreign Application Priority Data

Jan. 27, 2000 (EP) .......................................... 00890026

(51) Int. Cl.[7] ......................... G10L 15/20; G10L 21/06
(52) U.S. Cl. ....................................... 704/233; 704/275
(58) Field of Search ................................ 704/250, 233, 704/249, 253, 275

(56) References Cited

U.S. PATENT DOCUMENTS 4,008,375 A * 2/1977 Lanier ......................... 704/250
4,277,645 A * 7/1981 May, Jr. ...................... 704/233
4,535,473 A * 8/1985 Sakata ......................... 704/248
4,633,499 A * 12/1986 Nishioka et al. ............ 704/253
4,881,266 A * 11/1989 Nitta et al. ................. 704/253
5,657,422 A * 8/1997 Janiszewski et al. ........ 704/233

FOREIGN PATENT DOCUMENTS

WO WO9935640 7/1999 ............. G10L/9/06

OTHER PUBLICATIONS

Drago et al ("Digital Dynamic Speech Detectors", IEEE Transactions on Communications, Jan. 1978).*
Mak et al ("A Robust Speech/Non–Speech Detection Algorithm using Time and Frequency–Based Features", IEEE Internationa Conference on Acoustics, Speech, and Signal Processing, Mar. 1992).*

* cited by examiner

*Primary Examiner*—Richemond Dorvil
*Assistant Examiner*—Daniel A. Nolan
(74) *Attorney, Agent, or Firm*—Daniel J. Piotrowski

(57) ABSTRACT

A speech device for detecting a speech signal in a received signal and for determining a speech time slot, the device including a switch-on threshold detector for detecting certain detection information in relation to a threshold, and an information processing means for receiving and processing the detection information and for terminating the production of speech detection information featuring a speech time slot if the certain detection information was received during a first switch-off period, while the information processing means are arranged for additionally terminating the delivery of speech detection information if the certain detection information was not received during a second switch-off period and/or if certain detection information was received during a third switch-off period.

9 Claims, 2 Drawing Sheets

SPEECH DETECTION DEVICE HAVING MULTIPLE CRITERIA TO DETERMINE END OF SPEECH

The invention relates to a speech detection device having two switch-off criterions.

Such a speech detection device, such a speech detection method and such a computer program product are known as part of a speech recognition device that has been marketed by the applicants since 1998 as a computer program referred to as "Free Speech 98®". When a computer runs the computer program "FreeSpeech 98" and a user dictates a text into a microphone connected to the computer, the text recognized by the speech recognition means of the known speech recognition device is displayed on a monitor connected to the computer. During the dictation the user speaks the text sometimes fluently and sometimes with short pauses into the microphone. Sometimes the user holds the microphone too far away from his mouth, so that the signal-to-noise ratio of the electric microphone signal produced by the microphone is poor. During so-called speech time slots the microphone signal therefore contains a speech signal that corresponds to the user's spoken text and during so-called pause time slots no speech signal or a speech signal with a poor signal-to-noise ratio.

The speech detection device of the known speech recognition device can be supplied with the microphone signal delivered by the microphone as a received signal or as received data representing the received signal, respectively. The speech detection device detects the beginning and the end of the speech signal in the received signal and determines corresponding speech time slots. The speech detection device applies speech detection information to the speech recognition means during speech time slots, which speech recognition means process the microphone signal delivered by the microphone only during speech time slots.

For detecting the speech signal in the received signal, the known speech detection device includes a switch-on threshold detector and a switch-off threshold detector, which compare the energy content of the input signal to a first and a second energy threshold, the first energy threshold being higher than the second energy threshold. When the energy content of the received signal exceeds the first energy threshold, the switch-on threshold detector produces first detection information, and if the energy content of the received signal falls short of the second energy threshold, the switch-off threshold detector produces second detection information.

To determine the speech time slot, the speech detection device includes information processing means for receiving and processing the detection information. As a switch-on criterion of a speech time slot is determined the occurrence of the first detection information, after which the beginning of a speech time slot is determined by the information processing means 240 ms before the switch-on criterion is satisfied. The uninterrupted occurrence of the second detection information during a first switch-off period is determined as a switch-off criterion of the speech time slot, after which the end of the speech time slot is determined by the information processing means when the switch-off criterion is satisfied.

The known speech detection device, the known speech detection method and the known computer program product have the disadvantage that the switch-off criterion of the received signal is not satisfied when the energy content of the received signal varies around the second energy threshold. Such a received signal is applied to the speech recognition device, for example, when a user interrupts the dictation for a telephone conversation and puts the microphone on the table. The words spoken by the user or by another person in the room during the telephone conversation at a large distance from the microphone are applied to the microphone as microphone signals which occasionally contain a speech signal having a poor signal-to-noise ratio. This received signal with the speech signal having the poor signal-to-noise ratio is erroneously detected by the speech detection device as a speech signal suitable for the speech recognition, because the speech time slot is not terminated by the speech detection device. In this manner, a speech signal that is not at all provided for being recognized is processed by the speech recognition means with a recognition rate of the speech recognition device that is poor because of the poor signal-to-noise ratio and most probably a wrong text is recognized.

It is an object of the invention to eliminate the problems defined above and provide a speech detection device, a speech detection method and a computer program product of the type defined in the opening paragraph, in which a second switch-off criterion is provided for reliably terminating the speech time slots.

This achieves that in the information processing means is determined as a second switch-off criterion for terminating the speech time slots the uninterrupted lacking of the first detection information during a second switch-off period, after which the end of the speech time slots is also determined by the information processing means depending on whether the second switch-off criterion is satisfied. In addition to or in lieu of this second switch-off criterion, the information processing means can also verify a third switch-off criterion according to which there is tested whether first detection information was not received during a third switch-off period since the second detection information has been received for the first time after the first detection information had not been received.

Terminating the speech time slots in dependence on the second and/or third switch-off criterion offers the advantage that in that case too only one speech signal having a good signal-to-noise ratio is reliably used for speech recognition by a speech recognition device if, for example, a working condition as discussed above occurs and the received signal varies around the threshold.

By the measures as claimed in claim 2 is obtained a highly reliable second switch-off criterion and by the measures as claimed in claim 3 a highly reliable switch-on criterion for speech time slots. The measures as claimed in claim 4 adapt the energy threshold of the switch-on threshold detector and the switch-off threshold detector to the energy content of the noise signal in the received signal, so that the detection of a speech signal having a good signal-to-noise ratio is improved.

The inventions will be described in the following with reference to two examples of embodiment shown in the Figures, to which, however, the invention is not restricted.

FIG. 1 shows a computer into whose internal memory a computer program product can be loaded, which program product comprises software code sections and is formed by speech recognition software. When the computer 1 processes the speech recognition software, the computer 1 forms a speech recognition device for recognizing text information to be assigned to a speech signal.

Figures 2A, 2B, 2C, 2D, 2E, 2F:
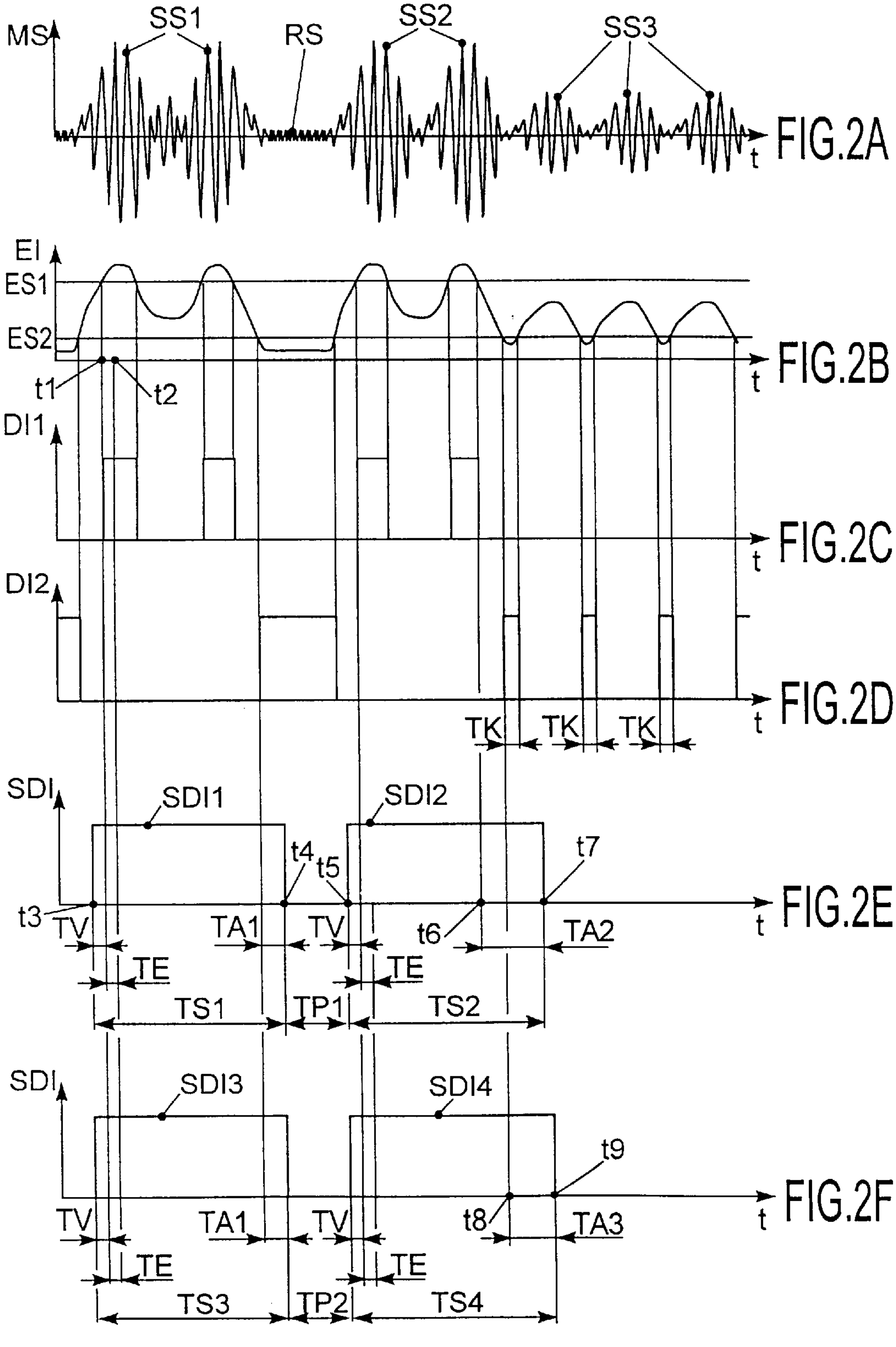
FIG. 2 shows the waveform as a function of time of signals and information which occur in the computer when the speech recognition software is run in accordance with the first and second examples of embodiment.

To an audio port 2 of the computer 1 can be connected a microphone 3 into which a user can dictate a text or a command and by which a microphone signal MS can be applied to the computer 1. From time to time the user speaks a text fluently and from time to time with short pauses into the microphone 3. Sometimes the user holds the microphone 3 far away from his mouth, so that then the signal-to-noise ratio of the microphone signal MS delivered by the microphone is relatively poor. Therefore, during so-called speech time slots TS the microphone signal MS contains a speech signal SS corresponding to the user's spoken text and, in so-called pause time slots TP no speech signal SS or a speech signal SS with a poor signal-to-noise ratio, which is unsuitable for being processed by the speech recognition device. Such a microphone signal MS delivered to the computer 1 by the microphone 3 via the audio port 2 can be applied as an input signal to the computer 1 and thus to the speech recognition device for being processed. FIG. 2*a* shows such a microphone signal MS as a function of time, which will be further explained hereinbelow.

To a monitor port 4 of the computer 1 can be connected a monitor 5 by which a text TX recognized by the speech recognition device can be displayed. For this purpose, text information TI representing the recognized text can be transferred from the monitor port 4 to the monitor 5.

The microphone signal MS can be applied from the audio port 2 to an A/D converter 6. The A/D converter 6 is arranged for digitizing the microphone signal MS applied to the A/D converter 6, as this is generally known. The A/D converter 6 can produce received data ED which contain the information contained in the microphone signal MS of the text spoken by the user.

The speech recognition device further includes storage means 7 to which can be applied received data ED delivered by the A/D converter 6. The storage means 7 in the computer 1 are formed by a hard disk and are arranged for storing the received data ED delivered to it. Received data ED delivered to the storage means 7 are permanently stored only when speech detection information SDI is received, which will be further explained hereinbelow.

The speech recognition device further includes a speech detection device 8 to which can also be applied the received data ED delivered by the A/D converter 6. The speech detection device 8 is arranged for detecting the time slots by evaluating the received data ED, during which time slots the microphone signal MS contains a speech signal SS which has a sufficiently good signal-to-noise ratio. When such a time slot is detected, the speech detection device 8 determines the suitable speech time slot TS, which will be discussed in further detail hereinbelow.

Furthermore, the speech recognition device only evaluates the parts of the microphone signal MS that were received during speech time slots TS, because only these parts of the microphone signal MS contain information of the text spoken by the user, which information can be evaluated successfully. For featuring the speech time slots TS, the speech detection device 8 delivers the speech detection information SDI to the storage means 7 which, consequently, store only those received data ED that contain information of the text spoken by the user, which information can be successfully evaluated by the speech recognition device.

The speech recognition device formed by the computer 1 further includes speech recognition means 9 by which a speech recognition method is executed to evaluate the received data ED stored in the storage means 7. For this purpose, activation information AI can be delivered to the storage means 7 by the speech recognition means 9 to enable delivery of received data ED permanently stored in the storage means 7. The structure and the way of operation of such speech recognition means such as the speech recognition means 9 and the steps of a speech recognition method, which method is executed in the speech recognition means 9, have been known for a long time and were disclosed, for example, in document WO 99/35640.

When a user speaks a text into the microphone 3, the microphone signal MS for example shown in FIG. 2A is applied to the speech recognition device formed by the computer 1. The microphone signal MS shown in FIG. 2A contains in time sections a first speech signal SS1, a second time signal SS2, a third speech signal SS3 and a noise signal RS. The third speech signal SS3 has a relatively low energy content compared to the noise signal RS, because the user has held the microphone 3 too far away from his mouth when he spoke this text. The signal-to-noise ratio of the third speech signal SS3 is therefore relatively poor, because of which the third speech signal SS3 is unsuitable for a successful processing with the speech processing means 9.

It is an object of the speech detection device 8 to determine speech time slots TS during which the microphone signal MS contains the first speech signal SS1 and the second speech signal SS2, to enable the speech recognition means 9 to process the information contained in these speech signals SS1 and SS2. The remaining time slots are to be determined as pause time slots PS by the speech detection device 8, during which time slots the microphone signal MS contains the noise signal RS and the third speech signal SS3. During pause time slots PS determined by the speech detection device 8, no speech detection information SDI is delivered to the storage means 7 by the speech detection device 8.

To achieve this object, the speech detection device 8 includes energy determining means 10, a switch-on threshold detector 11, a switch-off threshold detector 12 and information processing means 13. Received data ED which can be delivered by the A/D converter 6 can be applied to the energy determining means 10. The energy determining means 10 determine per evaluation time slot the energy content contained in the microphone signal MS by evaluation of the received data ED. An evaluation time slot is here 20 milliseconds. The received data ED are evaluated in the digital domain, as this would correspond in the analog domain to a squaring of the microphone signal MS and an integration of the squared microphone signal over respective evaluation time slots. The expert has long since been familiar with such an evaluation of data in the digital domain. Such determined energy information EI can be delivered by the energy determining means 10 to the switch-on threshold detector 11 and the switch-off threshold detector 12, which information features the energy content of the microphone signal MS.

FIG. 2B shows as a function of time the energy information EI of the microphone signal MS shown in FIG. 2A determined by the energy determining means 10. It can be detected that the speech signals SS1 and SS2 contained in the microphone signal MS have a larger energy content than the noise signal RS and the third speech signal SS3, as a result of which a detection of these speech signals SS1 and SS2 is possible by an evaluation of the energy information EI.

For this purpose, the switch-on threshold detector 11 continuously compares the value of the energy information EI delivered to the switch-on threshold detector 11 with the first energy threshold value ES1 stored in the switch-on threshold detector 11, which value ES1 is shown in FIG. 2B. The switch-on threshold detector 11 is arranged for producing first detection information DI1 when the energy content of the microphone signal MS is larger than the first energy threshold value ES1. The waveform as a function of time of the first detection information DI1 produced by the switch-on threshold detector 11 is shown in FIG. 2C when the microphone signal MS shown in FIG. 2A is received by the speech recognition device.

Furthermore, the switch-off threshold detector 12 continuously compares the value of the energy information EI delivered to the switch-off threshold detector 12 with a second energy threshold ES2 stored in the switch-off threshold detector 12, which energy threshold ES2 is shown in FIG. 2B. The switch-off threshold detector 12 is arranged for delivering second detection information DI2 when the energy content of the microphone signal MS is smaller than the second energy threshold ES2. The waveform as a function of time of the second detection information DI2 delivered by the switch-off threshold detector 12 is shown in FIG. 2D if the microphone signal MS shown in FIG. 2A is received by the speech recognition device.

The information processing means 13 can be supplied with the first detection information DI1 and the second detection information DI2. The information processing means 13 are arranged for evaluating the detection information DI1 and DI2 delivered thereto, for determining the speech time slots TS and for delivering the speech detection information SDI during determined speech time slots TS.

In the following is explained by way of example the way of operation of the information processing means 13 according to the first example of embodiment of the invention. According to the example, the information processing means 13 evaluate the detection information DI1 and DI2 shown in the FIGS. 2C and 2D, after which the speech detection information SDI is delivered by the information processing means 13 whose waveform as a function of time is represented in FIG. 2E.

From an instant t1 onwards, the information processing means 13 receive the first detection information DI1 and at an instant t2 the information processing means 13 establish that the first detection information DI1 has been received for a switch-on time period TE. As a result, the switch-on criterion is satisfied for a first speech time slot, which is featured by the speech detection information SDI1. The beginning of the first speech time slot is determined by the information processing means 13 already at an instant t3, which is an advance period TV earlier than the instant t1.

Waiting for the switch-on period TE provides the advantage that a brief large amplitude of the microphone signal MS of a brief loud noise, which may occur for example when the microphone 3 is put on a desk, is not erroneously detected as a speech signal SS by the information processing means 13. By laying down the beginning of the first speech time slot advanced by the advance period TV, the advantage is obtained that the received data ED of the first speech signal SS1 detected in the microphone signal MS are stored in the storage means 7 and subsequently further processed by the speech recognition means 9 before the first energy threshold ES1 is reached. This achieves that the received data ED of the whole first speech signal SS1 are stored and not the beginning of the first speech signal SS1 is lost for the processing by the speech recognition means 9. The two above-mentioned measures advantageously improve the recognition rate of the speech recognition device.

To reach a memory of the received data ED, which memory is advanced by the advance period TV and the switch-on period TE after the switch-on criterion has been satisfied, received data ED delivered to the storage means 7 are always stored in a receive buffer of the storage means 7. During the advance period TV and the switch-on period TE receive data ED to be expected can be stored in the receive buffer for a short while, which data ED can then permanently be stored in the storage means 7 at the instant t2 when the switch-on criterion is satisfied.

The information processing means 13 are provided for determining the end of the first speech time slot at an instant t4, while the first speech time slot has a speech period TS1. At the instant t4 the first switch-off criterion is satisfied according to which for the first switch-off period TA1 the second detection information DI2 is to be received uninterruptedly from the information processing means 13. As shown in FIG. 2E, from instant t3 to instant t4, the speech detection information SDI1 is delivered to the storage means 7 for the received data ED of the first speech signal SS1 to be stored.

Determining the end of the first speech time slot in the manner described above provides the advantage that when the energy content of the speech signal SS is briefly very small, the first speech time slot will not erroneously be terminated earlier, so that the received data ED of the last part of the first speech signal SS1 would not be applied to the speech recognition means 9 to be processed. Such a brief very small energy content of the speech signal SS may be obtained when consonants—such as "t" or "p"—are pronounced, also when there is a brief interruption of the microphone signal MS.

According to the example shown in FIG. 2, the information processing means 13 determine after a first pause period TP1 an instant t5 as the beginning of a second speech time slot, as was explained above with respect in the first speech time slot. During the second speech time slot the microphone signal MS contains the second speech signal SS2, which is followed by the third speech signal SS3. The energy content of the third speech signal SS3 varies around the second energy threshold ES2, while only during a time period TK, which is shorter than the first switch-off period TA1, the second detection information DI2 is received. The first switch-off criterion is therefore not satisfied during the third speech signal SS3, as a result of which the second speech time slot would not be terminated by the information processing means 13.

The information processing means 13 according to the first example of embodiment of the invention are now arranged for testing whether a second switch-off criterion is satisfied. The second switch-off criterion is satisfied when during a second switch-off period TA2 the first detection information DI1 was not received. From an instant t6 onwards the information processing means 13 no longer receive the first detection information DI1, as a result of which the information processing means 13 establish the presence of the second switch-off criterion at an instant t7. As shown in FIG. 2E, during a second speech period TS2, from instant t5 up to the instant t7, second speech detection information SDI2 is delivered to the storage means 7 for storage of the received data ED of the second speech signal SS2 from the instant t5 onwards.

As a result, the advantage is obtained that received data ED of a microphone signal MS containing only a noise signal RS or only the third speech signal SS3 with a poor signal-to-noise ratio are not applied to the speech recognition means 9, so that the recognition of a wrong text by the speech recognition means 9 is avoided.

Figure 1:
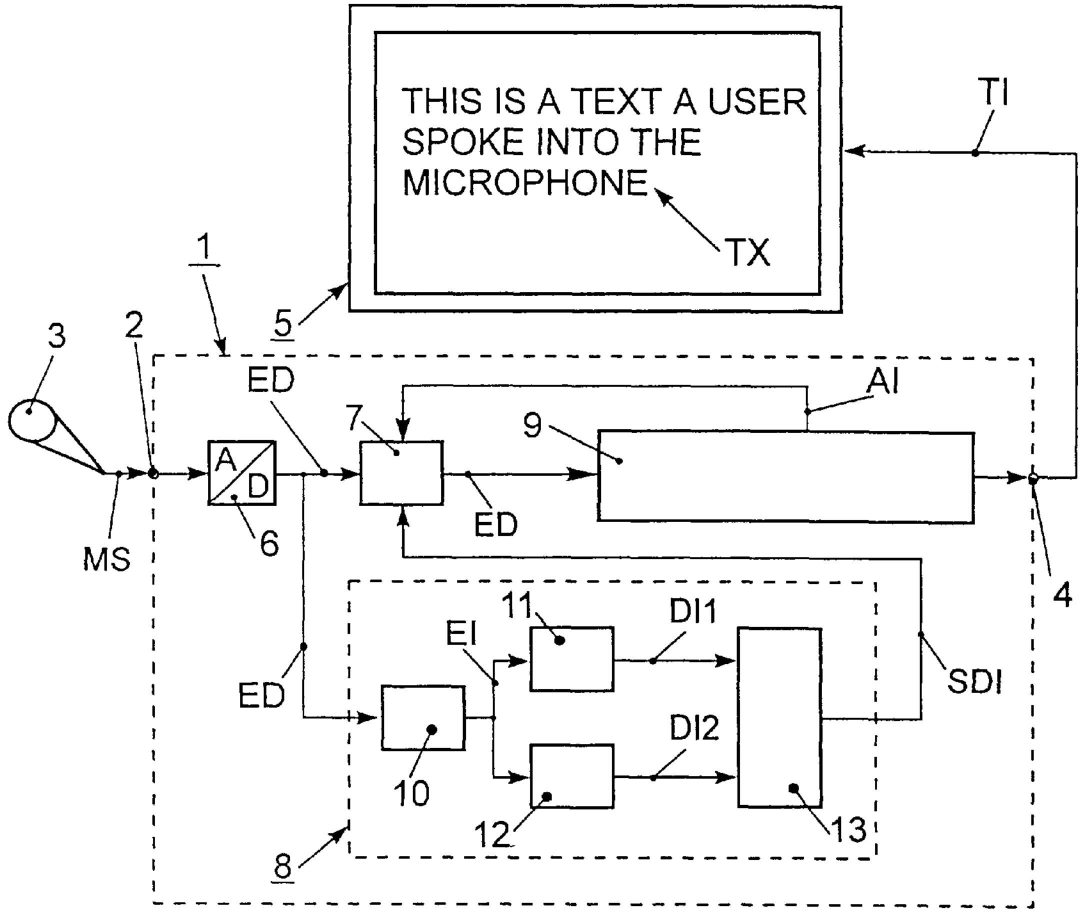
FIG. 1 shows in the form of a block diagram a computer to which a microphone and a monitor are connected and by which speech recognition software is run, so that the computer also forms a speech detection device.

In the following are further explained additional measures according to the invention and their advantages with reference to a second example of embodiment of the invention. The speech detection device according to the second example of embodiment corresponds to the speech detection device 8 shown in FIG. 1 in accordance with the first example of embodiment, while, however, the information processing means according to the second example of embodiment are arranged for verifying whether a first switch-off criterion or a third switch-off criterion is satisfied. The third switch-off criterion is satisfied when during a third switch-off period TA3 no first detection information DI1 was received, while the start of the third switch-off period TA3 is determined when the second detection information DI2 is subsequently received after the first detection information DI1 was lacking.

In the following is explained by means of an example the way of operation of the information processing means according to the second example of embodiment of the invention. According to this example, the microphone signal MS shown in FIG. 2A is delivered to the speech recognition device and detection information DI1 and DI2 shown in FIGS. 2C and 2D is evaluated by the information processing means. As a result of the evaluation by the information processing means according to the second example of embodiment, the information processing means deliver the speech detection information SDI to the storage means 7 of which the time pattern is shown in FIG. 2F.

The information processing means determine a third speech time slot which is featured by third speech detection information SDI3 having a third speech period TS3 and which third speech time slot corresponds to the first speech time slot according to the first example of embodiment. The beginning of the third speech time slot was determined by the switch-on criterion and the end of the third speech time slot was determined by the first switch-off criterion. After a second pause period TP2, the information processing means according to the second example of embodiment determine the start of a fourth speech time slot at the instant t5 when the switch-on criterion is satisfied.

From instant t6 onwards, the information processing means no longer receive the first detection information DI1 and at an instant t8 it receives the second detection information DI2 after the lacking of the first detection information DI1. At an instant t9 the information processing means establish that since the instant t8 the first detection information DI1 has no longer been received for the third switch-off period TA3, so that the third switch-off criterion is satisfied. Subsequently, at the instant t9 the information processing means determine the end of the fourth speech time slot having the speech period TS4. For featuring the fourth speech time slot, fourth speech detection information SDI4 is delivered to the storage means 7.

In this manner, the fact that the third switch-off criterion is tested by the information processing means according to the second example of embodiment provides the advantage that received data ED of a microphone signal MS containing only a noise signal RS or only the third speech signal SS3 which has a poor signal-to-noise ratio are not applied to the speech recognition means 9, so that the recognition of a wrong text by the speech recognition means 9 is avoided.

It may be observed that the speech detection information SDI can be applied to the switch-on threshold detector and the switch-off threshold detector. The threshold detectors could then be arranged for evaluating the energy content of the energy information EI in pause time slots TP to adapt the first and second energy thresholds to the energy content of the noise signal RS contained in a microphone signal MS during pause time slots TP.

This could offer the advantage that the speech detection device also then detects only speech signals SS having a good signal-to-noise ratio as such when the energy content of the noise signal RS has changed during the dictation, for example, as a result of a loud background noise.

It may be observed that a speech detection device according to the invention could also be provided with means for processing analog signals. The energy determining means could then square the analog received signal and integrate same via the evaluation time slots and apply the thus determined analog energy signal to two comparators, which would then form the switch-on threshold detector and the switch-off threshold detector.

It may be observed that a speech detection device according to the invention could also be incorporated in a dictating machine for recording the microphone signal on a magnetic tape cassette or a hard disk, to enable an automatic speech-controlled activation and deactivation of the recording of a dictation.

It may be observed that a speech detection device according to the invention could also be installed in other machines which are activated and deactivated by speech input. Such a machine is, for example, a mobile telephone.

What is claimed is:

1. A speech detection device for detecting a speech signal in a received signal and for determining a speech time slot, a switch-on threshold detector for delivering first detection information when the energy content of the received signal exceeds a first energy threshold, and including a switch-off threshold detector for delivering second detection information when the energy content of the received signal falls short of a second energy threshold, the second energy threshold being smaller than the first energy threshold, and including information processing means for receiving and processing the first detection information and the second detection information and for terminating the delivery of speech detection information featuring a speech time slot when the second detection information was received during a first switch-off period, characterized in that the information processing means are arranged for additionally terminating the delivery of speech detection information if the first detection information was not received during a second switch-off period and/or if the first detection information was not received during a third switch-off period, whereas the beginning of the third switch-off period is determined when the second detection information is received for the first time after the first detection information had not been received.

2. A speech detection device as claimed in claim 1, characterized in that in the information processing means the first switch-off period is shorter than the second switch-off period and/or the third switch-off period.

3. A speech detection device as claimed in claim 1, characterized in that the switch-on threshold detector is arranged for producing the first detection information when the energy content of the received signal is larger than the first energy threshold for at least one switch-on period.

4. A speech detection device as claimed in claim 1, characterized in that the speech detection device is arranged for adapting the first energy threshold and/or the second energy threshold to the energy content of the noise signal contained in the received signal.

5. A speech detection method of detecting a speech signal that has a sufficiently good signal-to-noise ratio in a received signal (MS) and for determining a speech time slot, the speech detection method comprising the following steps:

delivering first detection information when the energy content of the received signal exceeds a first energy threshold and delivering second detection information when the energy content of the received signal falls short of a second energy threshold, the second energy threshold being smaller than the first energy threshold and receiving and processing the first detection information and the second detection information and terminating the delivery of speech detection information featuring a speech time slot when the second detection information was received during a first switch-off period, characterized in that the information processing means are arranged for additionally terminating the delivery of speech detection information if the first detection information was not received during a second switch-off period and/or if the first detection information was not received during a third switch-off period whereas the beginning of the third switch-off period is determined when the second detection information is received for the first time after the first detection information had not been received.

6. A speech detection method as claimed in claim 5, characterized in that the first detection information is not delivered until the energy content of the received signal is larger than the first energy threshold during at least one switch-on period.

7. A speech detection method as claimed in claim 5, characterized in that the first energy threshold and/or the second energy threshold is adapted to the energy content of the noise signal contained in the received signal.

8. A computer program product which can be loaded directly into the internal memory of a digital computer and includes software code sections, characterized in that the steps of the speech detection method as claimed in claim 5 are executed by the computer when the product runs on the computer.

9. A computer program product as claimed in claim 8, characterized in that it is stored on a medium that can be read by a computer.

* * * * *